United States Patent
Latorre-Costa et al.

(10) Patent No.: US 9,126,695 B2
(45) Date of Patent: Sep. 8, 2015

(54) METHOD AND SYSTEM FOR DISPLAYING METEOROLOGICAL EVENTS ALONG A FLIGHT PLAN OF AN AIRCRAFT

(71) Applicant: Airbus Operations (S.A.S.), Toulouse (FR)

(72) Inventors: Pau Latorre-Costa, Toulouse (FR); Adrien Jarry, Muret (FR); François Bounaix, Cugnaux (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 14/541,723

(22) Filed: Nov. 14, 2014

(65) Prior Publication Data

US 2015/0142224 A1 May 21, 2015

(30) Foreign Application Priority Data

Nov. 19, 2013 (FR) ...................... 13 61333

(51) Int. Cl.
*B64D 43/00* (2006.01)
*B64D 45/00* (2006.01)
*G01C 21/00* (2006.01)
*G01C 21/34* (2006.01)
*G08G 1/16* (2006.01)
*G01C 23/00* (2006.01)
*G08G 5/00* (2006.01)

(52) U.S. Cl.
CPC .............. *B64D 43/00* (2013.01); *B64D 45/00* (2013.01); *G01C 21/00* (2013.01); *G01C 23/00* (2013.01); *G08G 5/0091* (2013.01)

(58) Field of Classification Search
CPC ........ B64D 43/00; B64D 45/00; G01C 21/00; G01C 23/00; G08G 5/0091

USPC ............................................... 701/14
See application file for complete search history.

(56) References Cited

U.S. PATENT DOCUMENTS

| | | | | |
|---|---|---|---|---|
| 5,660,547 | A * | 8/1997 | Copperman | 434/29 |
| 6,163,743 | A * | 12/2000 | Bomans et al. | 701/3 |
| 2001/0056316 | A1 * | 12/2001 | Johnson et al. | 701/14 |
| 2007/0038339 | A1 * | 2/2007 | Shirley et al. | 701/14 |
| 2010/0131126 | A1 * | 5/2010 | He et al. | 701/14 |
| 2010/0211237 | A1 * | 8/2010 | Nichols et al. | 701/14 |
| 2012/0232785 | A1 | 9/2012 | Wiesemann et al. | |
| 2012/0245836 | A1 * | 9/2012 | White et al. | 701/120 |
| 2013/0268878 | A1 | 10/2013 | Le Roux et al. | |
| 2014/0156115 | A1 * | 6/2014 | Aymeric et al. | 701/3 |

FOREIGN PATENT DOCUMENTS

| | | |
|---|---|---|
| FR | 2 744 525 | 8/1997 |
| FR | 2 969 124 | 6/2012 |
| FR | 2 998 960 | 6/2014 |

OTHER PUBLICATIONS

French Search Report for Application No. 13 61 333 dated Aug. 15, 2014.

* cited by examiner

*Primary Examiner* — Mary Cheung
*Assistant Examiner* — Frederick Brushaber
(74) *Attorney, Agent, or Firm* — Jenkins, Wilson, Taylor & Hunt, P.A.

(57) ABSTRACT

Method and system for displaying meteorological phenomena encountered by an aircraft flying along a flight plan. The display system includes a display device configured to present on a screen a meteorological indicator, the meteorological indicator comprising a time line representing a time scale relating to the duration of the flight of the aircraft along the flight plan and, on this time line, a set of first symbols illustrating meteorological phenomena and a second symbol indicating the current instant.

15 Claims, 4 Drawing Sheets

METHOD AND SYSTEM FOR DISPLAYING METEOROLOGICAL EVENTS ALONG A FLIGHT PLAN OF AN AIRCRAFT

TECHNICAL FIELD

The present disclosure relates to a method and a system for displaying meteorological phenomena encountered by an aircraft, in particular a transport airplane, flying along a flight plan.

BACKGROUND

The meteorological phenomena considered can comprise, especially, turbulence zones, icing zones, jet streams, as well as significant events such as volcanic eruptions or radioactive emissions.

It is known that a certain number of means are made available to the crew of an aircraft to provide information on the meteorological phenomena liable to have an impact on the flight along the envisaged flight plan. In particular, the following meteorological information sources used in the aeronautical domain are known: TEMSI charts, WINTEM charts, SIGMET messages, METAR messages, information from a meteorological radar, etc.

Although a set of means describing the atmospheric conditions which may have an effect on the flight are thus available to the crew of an aircraft, these means are separate and taken into account individually. Consequently, the crew themselves are compelled to summarize all the information provided to them. Moreover, such information is not necessarily correlated with the flight plan.

Thus, in particular, before a flight, the flight operations may provide the crew with a set of meteorological charts. Each meteorological chart presents a type of meteorological phenomenon or a group of meteorological phenomena over a very precise region of the Earth in a particular altitude layer. Moreover, each chart exhibits a temporal validity.

It is possible to estimate the number of charts received by a crew. This number corresponds to the number of types of chart, multiplied by the number of altitude layers, multiplied by the number of periods of validity of the prediction, multiplied by the number of prediction regions concerned in the flight, thus giving a very sizable number of charts.

The crew must then estimate, as a function of the flight plan followed (which defines a trajectory in space evolving in the course of time, that is to say a four-dimensional trajectory), the meteorological phenomena or the conditions of the atmosphere which will have an impact on the flight. They must thus search for a correlation between on the one hand the various charts and information with which they are provided, and on the other hand the flight plan. Such a task requires a good capacity for abstraction in four dimensions and for correlation of the various pieces of information.

In addition to possibly presenting a risk of erroneous interpretation, this customary procedure for processing and understanding the available information relating to the meteorological conditions liable to be encountered by an aircraft presents a considerable workload for the crew.

SUMMARY

An object of the present disclosure is to remedy this drawback. It relates to a method of displaying meteorological phenomena encountered by an aircraft flying along a flight plan.

According to the disclosure, the method comprises automatically:

a) in receiving meteorological phenomena determined by a plurality of meteorological information sources, each of the meteorological phenomena being defined by a defining volume and a period of validity;

b) in identifying, from among these meteorological phenomena received, the set of meteorological phenomena for which, on each occasion, a reference volume dependent on the corresponding defining volume is envisaged to be traversed by a leg of the flight plan during the corresponding period of validity, and in defining, for each of the meteorological phenomena thus identified, an associated intersection span representing the common time interval between the period of validity of the meteorological phenomenon considered and the duration associated with the leg of the flight plan traversing the reference volume of the meteorological phenomenon considered; and c) in presenting, on at least one screen of a display device, at least one meteorological indicator, the meteorological indicator comprising at least one time line representing a time scale relating to the duration of the flight of the aircraft along the flight plan and, on this time line, at least:
  a set of first symbols illustrating the meteorological phenomena identified in step b) and each positioned on the time line at the level of the associated intersection span; and
  a second symbol indicating the current instant.

Thus, by virtue of the disclosure, an integrated display of the various meteorological phenomena which will be encountered is carried out by the aircraft during an envisaged flight along a flight plan. This integration of all the available information relating to the meteorological conditions, in a single meteorological indicator, makes it possible to reduce the workload of the crew, and all the more so as the display, such as considered, of the information on a unidimensional time line (representing a time scale relating to the duration of the flight of the aircraft along the flight plan), is easily readable and comprehensible by the crew.

Within the framework of the present disclosure, the flight plan taken into account for the display corresponds to one of the following elements:
  either, to an overall flight plan of the aircraft from takeoff to landing;
  or, to a part of such an overall flight plan.

Moreover, the method of displaying meteorological phenomena can present the following characteristics, taken individually or in combination:
  in step c), auxiliary information relating to the flight along the flight plan is presented on the meteorological indicator and positioned on the time line at the times of its occurrence;
  the first symbols are differentiated from one another on the meteorological indicator, as a function of the types and/or intensities of the meteorological phenomena illustrated;
  the reference volume corresponds simply to the defining volume, or step b) determines a reference volume by widening the defining volume;
  step b) comprises determining a longitudinal safety tunnel, around and along the flight plan, and identifying the meteorological phenomena which are envisaged to be traversed by this longitudinal safety tunnel;
  step b) takes into account a temporal safety margin relating to at least one of the following elements:
  the period of validity of a meteorological phenomenon;
  the temporal following of the flight plan by the aircraft;

the display method comprises a step of receiving an update of at least one meteorological phenomenon and/or of the flight plan, and steps b) and c) take such an update into account to update the meteorological indicator;

in the absence of meteorological information relating to the presence of meteorological phenomena over a given time span, step c) displays a third symbol on the time line at the level of this time span, this third symbol signaling an absence of meteorological information;

step b) is implemented, moreover, for at least one auxiliary flight plan, for example so as to carry out a rerouting, and step c) presents a meteorological indicator which comprises, in addition to a time line relating to the flight plan, an auxiliary time line relating to the auxiliary flight plan.

The present disclosure also relates to a system for displaying meteorological phenomena encountered by an aircraft, in particular a transport airplane, flying along a flight plan.

According to the disclosure, the display system comprises:

a data reception unit configured to receive meteorological phenomena determined by a plurality of meteorological information sources, each of the meteorological phenomena being defined by a defining volume and a period of validity;

a central unit configured to identify, from among the meteorological phenomena received by the data reception unit, the set of meteorological phenomena for which, on each occasion, a reference volume dependent on the corresponding defining volume is envisaged to be traversed by a leg of the flight plan during the corresponding period of validity, the central unit being also configured to define, for each of the meteorological phenomena thus identified, an associated intersection span representing the common time interval between the period of validity of the meteorological phenomenon considered and the duration associated with the leg of the flight plan traversing the reference volume of the meteorological phenomenon considered; and a display device configured to present, on at least one screen, at least one meteorological indicator, the meteorological indicator comprising at least one time line representing a time scale relating to the duration of the flight of the aircraft along the flight plan and, on this time line, at least:

a set of first symbols illustrating the meteorological phenomena identified and each positioned on the time line at the level of the associated intersection span; and a second symbol indicating the current instant.

Advantageously:

the display device is configured to present, on the screen, in addition to the meteorological indicator, a navigation display representing meteorological phenomena; and/or the display system comprises, moreover, the plurality of meteorological information sources, which are able to transmit data to the data reception unit.

BRIEF DESCRIPTION OF THE DRAWINGS

The figures of the appended drawing will elucidate the manner in which the disclosure may be embodied. In these figures, identical references designate similar elements.

DETAILED DESCRIPTION

Figure 1:
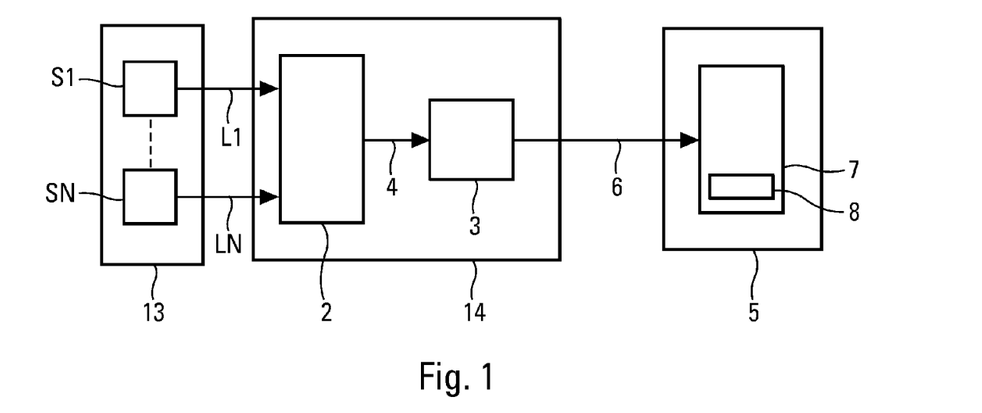
FIG. 1 is the schematic diagram of a display system which illustrates an embodiment of the disclosure.

System 1 is represented schematically in FIG. 1 and makes it possible to illustrate the disclosure is intended to display meteorological phenomena encountered by an aircraft AC, in particular a civil transport airplane, flying along a flight plan.

According to the disclosure, the display system 1 comprises:

a data reception unit 2 able to receive meteorological phenomena determined by a plurality of N meteorological information sources S1 to SN (or meteorological products), N being an integer greater than 1. Each of the meteorological phenomena is defined by a volume in three-dimensional space, termed the defining volume, and a period (or duration) of validity;

a central unit 3 which is connected by way of a link 4 to the data reception unit 2 and which is formed so as to identify, from among the meteorological phenomena received by the unit 2, the set of meteorological phenomena for which, on each occasion, a reference volume dependent on the corresponding defining volume is envisaged to be traversed by a leg of the flight plan during the corresponding period of validity. The central unit 3 is also formed so as to define, for each of the meteorological phenomena thus identified, an associated intersection span representing the common time interval between the period of validity of the meteorological phenomenon and the time interval associated with the leg of the flight plan traversing the reference volume of the meteorological phenomenon; and a display device 5 which is connected by way of a link 6 to the central unit 3 and which is formed so as to present, on at least one screen 7, at least one meteorological indicator 8.

Figure 2:
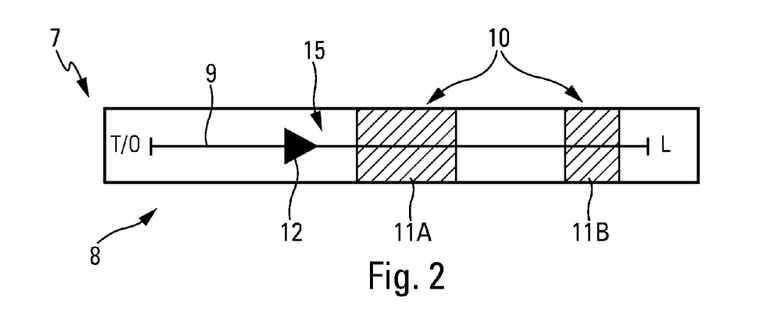
FIGS. 2, 3, 5, 6, 8 and 10 to 12 show various examples of meteorological indicators liable to be displayed by the display system.

According to the disclosure, the meteorological indicator 8 comprises, as represented in FIG. 2, at least one (flight) time line 9 representing a time scale relating to the duration of the flight of the aircraft along the flight plan. The meteorological indicator 8 comprises, moreover, on this time line 9:

a set 10 of first symbols 11A, 11B illustrating the meteorological phenomena identified and each positioned on the time line 9, at the level of the associated intersection span; and a second symbol 12 indicating the current (or present) instant.

In the example of FIG. 2, the first symbols 11A and 11B are represented in the form of rectangles which can exhibit, for example, a particular color (illustrated by hatching).

Thus, the display system 1 in accordance with the disclosure carries out integrated display of the various meteorological phenomena which will be encountered by the aircraft during a flight along an envisaged flight plan. The meteorological phenomena considered can comprise, especially, turbulence zones, icing zones, jet streams, as well as significant events such as volcanic eruptions or radioactive emissions.

This integration of all the available information relating to the meteorological conditions (arising from a set 13 of N information sources S1 to SN), in a single meteorological indicator 8, makes it possible to reduce the workload of the crew, and all the more so as the display of the information on a time line 9 (therefore representing a time scale relating to the duration of the flight of the aircraft along the flight plan) is easily readable and comprehensible. The display of the meteorological information on a (flight) time line 9 allows the crew to rapidly identify the phenomena impacting a flight by utilizing a maximum of available information. The meteorological indicator 8 therefore makes it possible to group together as many meteorological information sources as possible on a unidimensional time line. This line represents a projection of the x, y, z coordinates onto the flight plan as a function of time.

The display system 1 comprises, moreover, the set 13 of meteorological information sources S1 to SN, which are able to be connected by way of customary data transmission links L1 to LN to the data reception unit 2 and which are able to transmit data to the data reception unit 2.

The set 13 can comprise meteorological information sources generating, in a customary manner, TEMSI charts, WINTEM charts, SIGMET messages, METAR messages, information from a meteorological radar, etc.

In a particular embodiment, the units 2 and 3 form part of a processing unit 14.

The flight plan taken into account in the disclosure corresponds to one of the following elements:
  either, as represented in FIG. 2, to an overall flight plan of the aircraft, from takeoff (indicated by T/O in FIG. 2) to landing (indicated by L in FIG. 2);
  or, to just a part of this overall flight plan, for example the cruising flight part of this overall flight plan.

The display system 1 can be integrated into a portable element, such as a computer, in particular of EFB ("Electronic Flight Bag") type. It can also be mounted on the aircraft:
  either entirely;
  or just in part. For example, just the display device 5 is mounted fixedly on the aircraft, and the processing unit 14 forms part of a portable device and can be connected up to the display device 5 via an appropriate link 6.

The time line 9 therefore represents the flight duration envisaged in a summary manner, preferably from takeoff (T/O in FIG. 2) to landing (L in FIG. 1), the time evolving from left to right. The space around the unidimensional time line 9 contains a background 15 (FIG. 2) on which the zones of intersection of meteorological phenomena (symbols 11A and 11B for example) are displayed.

The symbol 12 (represented in the form of a triangle) indicates the present (or current) time (or instant), thus making it possible to indicate where the aircraft is situated in time with respect to the flight plan. In the example of FIG. 2, the current instant (highlighted by the symbol 12) is situated at about 30% of the duration illustrated by the time line 9, thus signifying that at the current instant, the aircraft is situated at a position of its overall flight plan corresponding to about 30% of the total duration of the flight.

Figure 3:
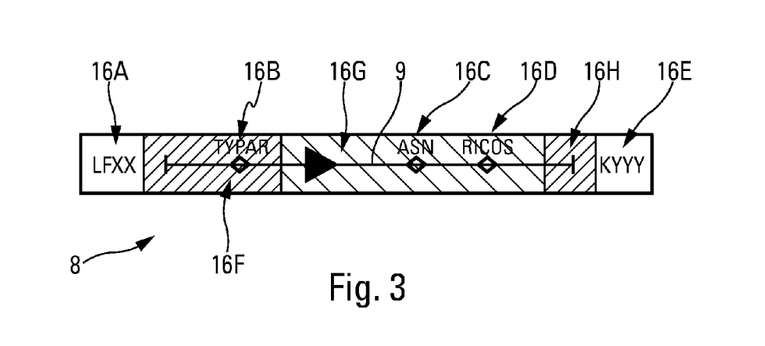

Moreover, in a particular embodiment represented in FIG. 3, the display device 5 also presents on the time line 9 auxiliary information 16A to 16H relating to the flight along the flight plan (or relating to the mission). This auxiliary information 16A to 16H is positioned at the times of its occurrence. This auxiliary information 16A to 16H which comprises for example the departure airport LFXX, the arrival airport KYYY, waypoints (TYPAR, ASN, RICOS), and the type of zone overflown 16F, 16G and 16H, makes it possible to facilitate the location of the meteorological phenomena by the pilots and thus to improve the mental representation of the situation.

The central unit 3 therefore carries out, initially, a processing of the data with the various meteorological products (or meteorological information sources) which are provided as input. This processing consists in identifying in these products all the meteorological phenomena defined in these products as being valid for the duration of the flight. The information output consists of a list of phenomena characterized by the meteorological information source S1, . . . , SN, as well as all the information defined for this phenomenon in the meteorological information source.

The central unit 3 thereafter selects, subsequently, from among the meteorological phenomena identified, those that the aircraft ought to encounter during the flight, and calculates the (temporal) span of intersection of each of these meteorological phenomena with the flight plan.

Most meteorological phenomena are characterized by a defining volume in space. By way of example, zones of convection, turbulence or icing are often defined by a surface (X, Y) delimited in a horizontal plane, and by a low limit (floor) and a high limit (ceiling) in altitude (Z). Moreover, these phenomena are defined as being valid for a period of time, called the period of validity.

The flight plan can also be characterized by a four-dimensional trajectory in which the position in space (X, Y, Z) of each point of this trajectory is associated with an envisaged time of transit. Thus, any leg of the flight plan in space is associated with a predicted time interval.

The central unit 3 considers that a meteorological phenomenon presents an intersection with the flight plan if its defining volume in space is traversed by a leg of the envisaged flight plan to be flown by the aircraft during the period of validity of the meteorological phenomenon.

The (temporal) span of intersection is therefore defined as being equal to the common time interval between the period of validity of the meteorological phenomenon considered and the duration associated with the leg of the flight plan traversed by the meteorological phenomenon.

Figure 4A:
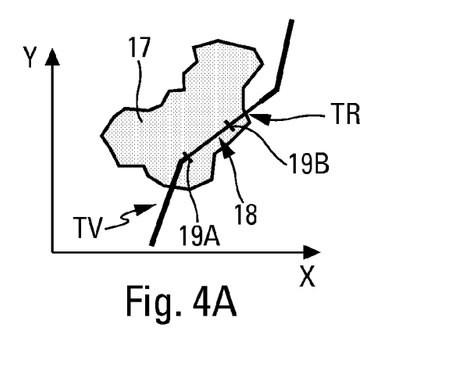
FIGS. 4A, 4B, 7 and 9 illustrate various situations during a flight of an aircraft along a flight trajectory, to which the present disclosure is applied.
Figure 4B:
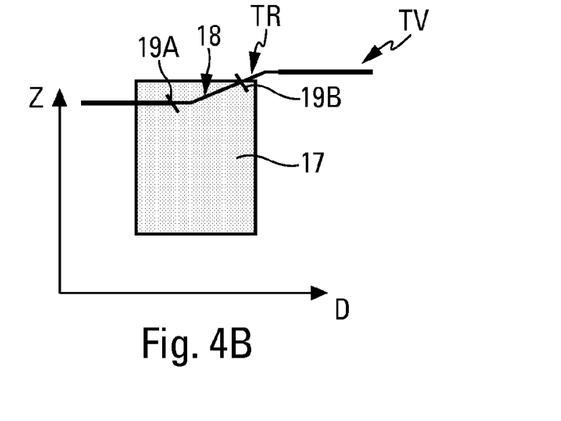

FIGS. 4A and 4B schematically show a part of a trajectory TV according to the flight plan and a meteorological phenomenon 17, respectively, in a lateral plane (X, Y) and in a vertical plane Z according to a distance D along the flight plan.

In FIGS. 4A and 4B:
  the part of the trajectory TV according to the flight plan is represented as a black line;
  the meteorological phenomenon 17 is represented by a gray polygon;
  the leg TR of the flight plan envisaged to be flown by the aircraft during the period of validity of the meteorological phenomenon 17 is represented as a slender black line; and
  the (temporal) span of intersection 18 is delimited by two dashes 19A and 19B.

The (temporal) span of intersection 18 therefore corresponds to the time interval in the course of which it is envisaged that the aircraft will intercept the meteorological phenomenon 17 in its journey along the flight plan, and only if the meteorological phenomenon 17 is valid (that is to say exists) when intersection takes place. Thus, the display system 1 only takes into account those zones of the phenomena which will actually be encountered by the aircraft during its navigation (over time and in space), since only these zones are considered to be worthy of the crew's attention.

The display device 5 displays on the meteorological indicator 8, for each phenomenon identified as having an intersection with the flight plan, zones (symbols 11A and 11B of FIG. 2), on the time line 9 corresponding to the temporal spans of intersection of each of these meteorological phenomena. Thus, the time line 9 provides a complete vision of all the zones in which the aircraft is envisaged to encounter a meteorological phenomenon during the flight.

Figure 5:
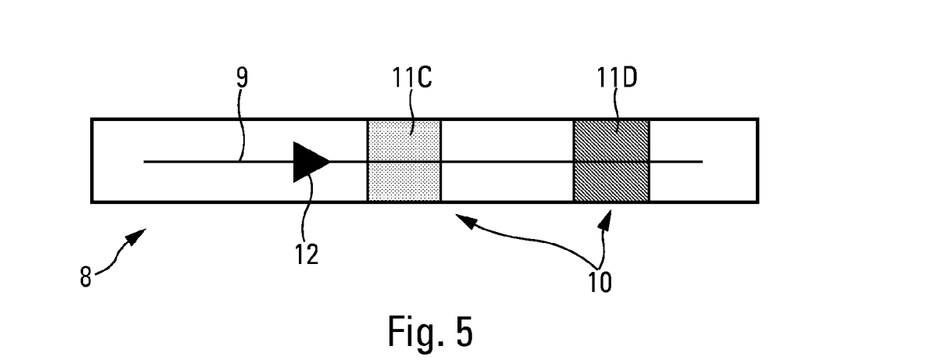

In a particular embodiment represented in FIG. 5, the first symbols 11C and 11D are differentiated from one another on the meteorological indicator 8, as a function of the types (for example a turbulence zone, an icing zone, jet streams, etc.) of meteorological phenomena illustrated.

To distinguish the various types of meteorological phenomena, the display system 1 envisages implementing a display code, either by way of a dedicated symbology, or by a code of colors, so that each meteorological phenomenon is easily identifiable on the time line 9.

Figure 6:
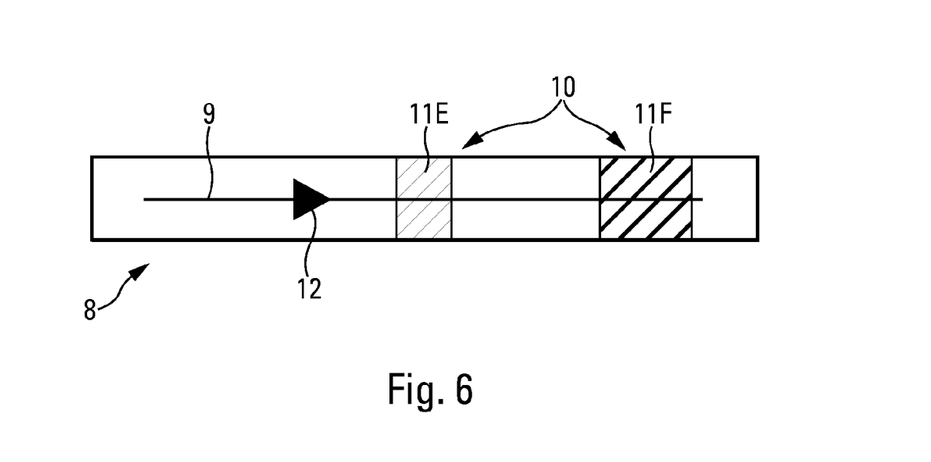

Furthermore, in another embodiment represented in FIG. 6, the symbols 11E and 11F are differentiated from one another on the meteorological indicator, as a function of the intensities of the meteorological phenomena illustrated.

This differentiation can be carried out in various ways by modifying for example the color or the size of the line of a pattern. In FIG. 5, the difference of intensities is highlighted by a different size of the hatching of the symbols 11E and 11F.

Figure 7:
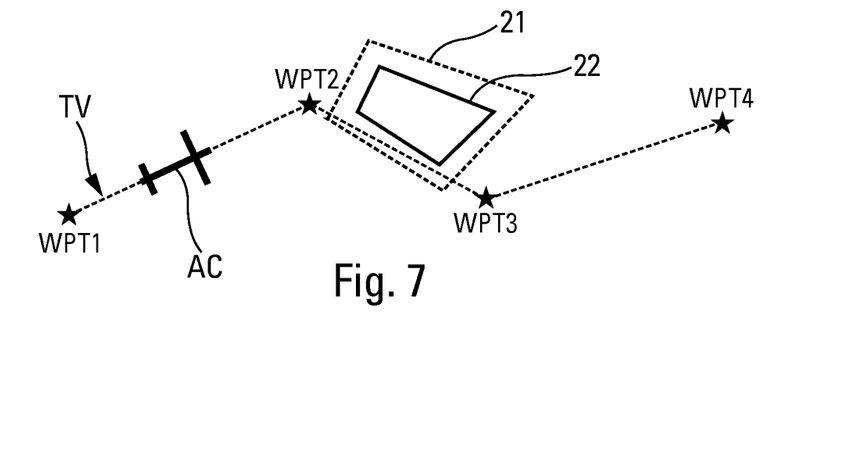

The reference volume of a meteorological phenomenon can correspond to its defining volume. However, in a preferred embodiment, the central unit 3 determines a reference volume 21 by widening the defining volume 22 (received from the unit 2), as represented in FIG. 7.

This widening may differ as a function of the direction considered. However, preferably, it is uniform, by multiplying the defining volume 22 (in all the directions X, Y and Z) by one and the same widening factor to obtain the reference volume 21. The widening factor in respect of the defining volume 22 associated with a meteorological phenomenon is defined as a function of the instability of the meteorological phenomenon and of the preciseness of the meteorological forecast defining this phenomenon.

This particular embodiment makes it possible to avoid omitting the display of certain zones on the time line 9 although they present some interest to the crew due to the proximity of a meteorological phenomenon with the flight plan (illustrated by waypoints WPT1, WPT2, WPT3, WPT4, in FIG. 7) followed by the aircraft AC flying along the trajectory TV.

A certain margin of error with respect to the exact location of a meteorological phenomenon is thus envisaged, by taking into account a widening factor in respect of the volume of the meteorological phenomena, thereby making it possible to remedy a possible lack of preciseness of the meteorological forecasts.

Figure 8:
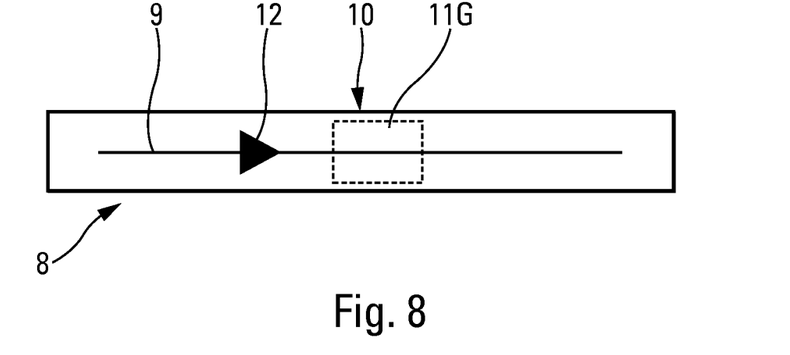

The corresponding intersection zone, between the reference volume 21 and the flight plan (trajectory TV), is displayed on the meteorological indicator 8 in the form of a symbol 11G (FIG. 8). If the display system 1 had taken the defining volume 22 into account, no zone would have been displayed on the meteorological indicator 8 of FIG. 8, since the defining volume 22 is not traversed by the flight plan (trajectory TV), as represented in FIG. 7.

Figure 9:
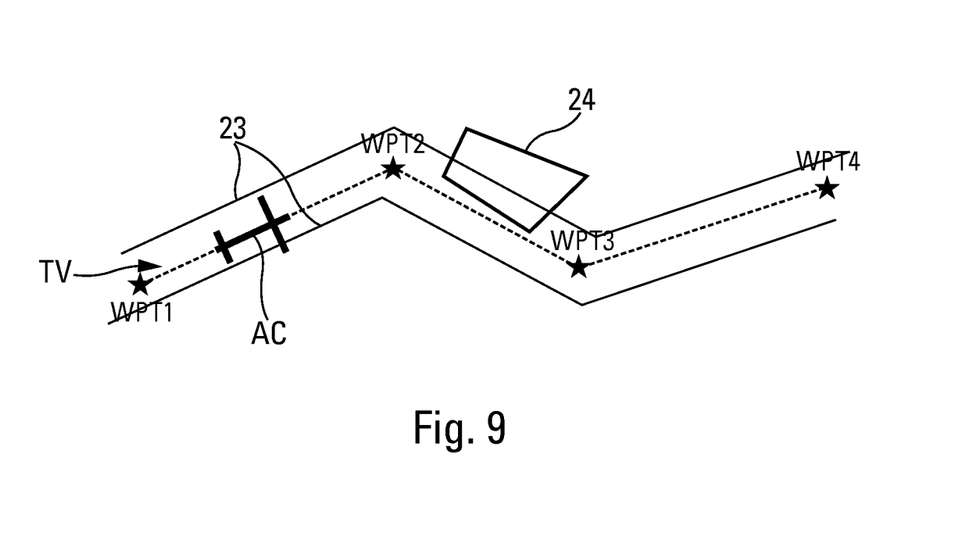

Moreover, in a particular embodiment, the central unit 3 determines a longitudinal safety tunnel 23, of circular square or rectangular cross-section, around and along the flight plan TV, as represented in FIG. 9, and identifies the meteorological phenomena which are envisaged to be traversed by this longitudinal safety tunnel 23, like that illustrated by a reference volume 24 in FIG. 9.

Figure 10:
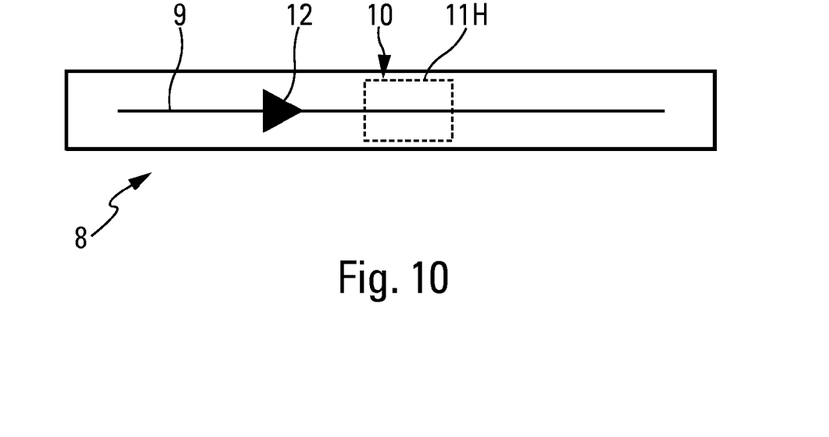

The corresponding intersection zone, between the reference volume 24 and the longitudinal safety tunnel 23 around the flight plan (trajectory TV), is displayed on the meteorological indicator 8 in the form of a symbol 11H (FIG. 10). If the display system 1 had taken only the trajectory TV into account, no zone would have been displayed on the meteorological indicator 8 of FIG. 10, since the defining volume 24 is not traversed by the trajectory TV, as represented in FIG. 9.

Thus, a safety margin (safety tunnel 23) is created around the flight plan so as to display the meteorological events liable to have an impact on the flight, which are situated in proximity to but not in direct intersection of the flight plan (trajectory TV).

The aforementioned solutions for displaying the zones at risk are also valid in the horizontal and temporal scale. A tunnel is therefore formed, which makes it possible to display all the events which are situated in proximity to the aircraft AC in a four-dimensional space.

In particular, in a particular embodiment, the central unit 3 takes into account:
- a temporal safety margin relating to the period of validity of a meteorological phenomenon; and/or
- a temporal safety margin relating to the temporal following of the flight plan by the aircraft AC, the aircraft not necessarily being situated exactly at the expected spot at a given instant (along its flight plan).

On account of the variable nature of meteorological phenomena, meteorological forecasts evolve over time. Generally, the preciseness of a forecast is all the greater the smaller the gap between the publication of a piece of meteorological information and the period of validity of the phenomena that it defines. The meteorological information is regularly updated, as a function of the meteorological information source S1 to SN, as well as of the nature of the meteorological phenomena which are observed.

Generally, the meteorological information is published at regular intervals. The display system 1 integrates the information available at the outset, that is to say the latest published information, be it on the ground before takeoff (for example during flight preparation) or in flight. By considering the availability of new meteorological information in the course of the flight, it is possible to envisage an updating of the meteorological indicator 8.

Thus, in a particular embodiment, the data reception unit 2 is able to receive an update of at least one meteorological phenomenon. In this case, the central unit 3 and the display device 5 take such an update into account to update the meteorological indicator 8.

Consequently, on an aircraft equipped with communication structure (data reception unit 2) able to receive updates while in flight, the meteorological indicator 8 can evolve with each new piece of meteorological information received.

Furthermore, in a particular embodiment, the data reception unit 2 is able to receive an update of the flight plan. In this case, the central unit 3 and the display device 5 take such an update of the flight plan into account to update the meteorological indicator. Thus, when the flight plan is modified, the intersections are recalculated and the information available on the time line 9 is updated.

Figure 11:
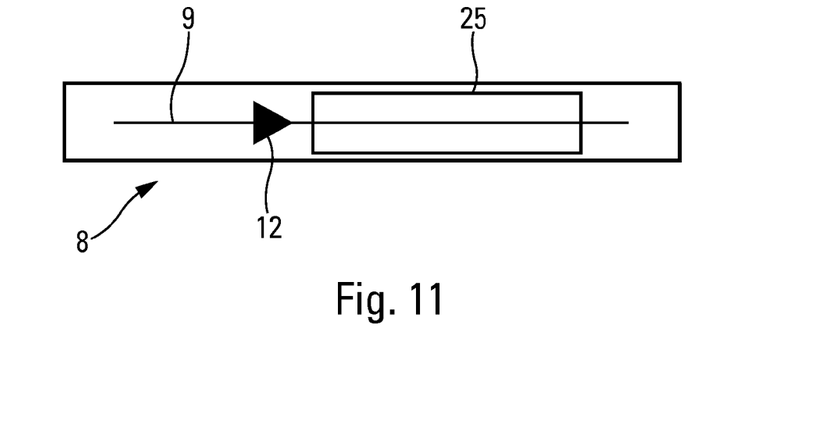

Moreover, in the absence of meteorological information relating to the presence of meteorological phenomena over a given time span, that is to say in the absence of data for the construction of the meteorological indicator 8, the display device 5 displays, as represented in FIG. 11, a symbol 25 on the time line 9 at the level of this time span. This symbol 25 (comprising for example a specific text and/or a specific color) signals an absence of meteorological information. This display of the symbol 25 makes it possible to clearly differentiate the absence of available information from the absence of meteorological phenomena along the flight plan.

Figure 12:
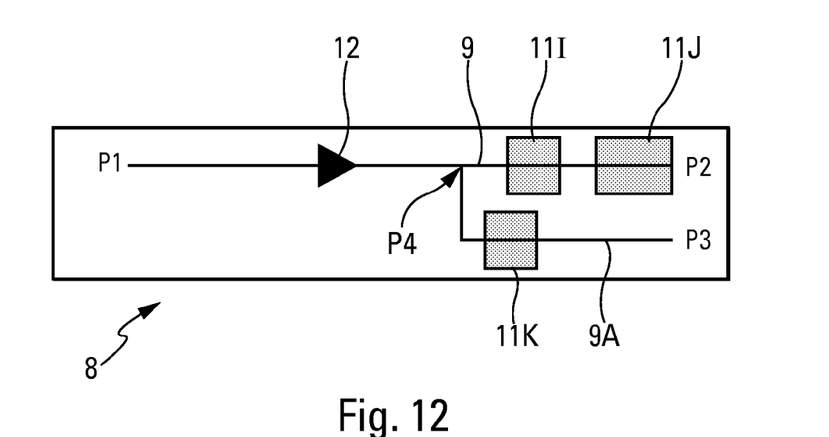

Moreover, in a particular embodiment, the disclosure is implemented, additionally, for at least one auxiliary flight plan. In this case, the display device 3 presents a meteorological indicator 8 which comprises, in addition to a time line 9 for the flight plan, an auxiliary time line 9A for the auxiliary flight plan, as represented in FIG. 12.

The time line 9 is defined between a point P1 and a point P2, for example respectively two airports (departure and destination) and the time line 9A is defined between the point P1 and a point P3, for example also two airports. The two trajectories separate at a point P4. Moreover, the time line 9 comprises first symbols 11I and 11J and the auxiliary time line 9A a first symbol 11K.

Thus, the display system 1 is able to display several time lines 9 and 9A, in particular so as to aid the crew to take a decision relating to a rerouting. Indeed, the viewing of the meteorological phenomena which will be encountered on two (or more) routes makes it possible to provide the crew with all the information allowing them to take such a decision.

Moreover in a particular embodiment, the display device 5 is configured to present, on the screen 7, in addition to the meteorological indicator 8, a navigation display (not represented) representing the meteorological phenomena.

The display system 1 which therefore performs an integration of the meteorological data and of the flight plan, carries out, especially:

an integration of periods of validity. The display system 1 integrates over time, in a coherent manner, the meteorological data which are proposed as a static summary of a situation in a time slice (for example the charts of significant weather are created for slices of 6 hours);

an integration of altitude layers. The meteorological forecasts representing various altitude layers, the display system 1 integrates, in accord with the vertical profile of the flight plan, all the various altitude layers; and an integration of various types of products (or meteorological information sources). Although the number of meteorological products is considerable and the representations of the meteorological phenomena that they describe vary depending on the providers of meteorological services, the display system 1 integrates the various types of phenomena and products in a single display (meteorological indicator 8), while allowing the crew to distinguish the severity and the prioritization of the meteorological phenomena.

While at least one exemplary embodiment of the present disclosure has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein. In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. It should be understood that I wish to embody within the scope of the patent warranted hereon all such modifications as reasonably and properly come within the scope of my contribution to the art. Such modifications, substitutions and alternatives can be made without departing from the spirit and scope of the disclosure, which should be determined from the appended claims and their legal equivalents.

The invention claimed is:

1. A method of displaying meteorological phenomena encountered by an aircraft flying along a flight plan, on at least one screen of a display device comprising at least one time line, the time line representing a time scale relating to the duration of the flight of the aircraft along the flight plan and comprising a symbol indicating the current instant, the method comprising automatically:

a) receiving meteorological phenomena determined by a plurality of meteorological information sources, each of the meteorological phenomena being defined by a defining volume and a period of validity;

b) identifying, from among these meteorological phenomena received, the set of meteorological phenomena for which, on each occasion, a reference volume dependent on the corresponding defining volume is envisaged to be traversed by a leg of the flight plan during the corresponding period of validity, and in defining, for each of the meteorological phenomena thus identified, an associated intersection span representing the common time interval between the period of validity of the meteorological phenomenon considered and the duration associated with the leg of the flight plan traversing the reference volume of the meteorological phenomenon considered; and c) presenting, on the screen of the display device, at least one meteorological indicator, the meteorological indicator comprising at least the time line and, on this time line, at least one set of first symbols illustrating the meteorological phenomena identified in step b) and each positioned on the time line at the level of the associated intersection span.

2. The method as claimed in claim 1, wherein in step c), auxiliary information relating to the flight along the flight plan is presented on the meteorological indicator and positioned on the time line at the times of their occurrence.

3. The method as claimed in claim 1, wherein the first symbols are differentiated from one another on the meteorological indicator, as a function of the types of the meteorological phenomena illustrated.

4. The method as claimed in claim 1, wherein the first symbols are differentiated from one another on the meteorological indicator, as a function of the intensities of the meteorological phenomena illustrated.

5. The method as claimed in claim 1, wherein step b) determines a reference volume by widening the defining volume.

6. The method as claimed in claim 1, wherein step b) comprises determining a longitudinal safety tunnel, around and along the flight plan, and identifying the meteorological phenomena which are envisaged to be traversed by this longitudinal safety tunnel.

7. The method as claimed in claim 1, wherein step b) takes into account a temporal safety margin relating to at least one of the following elements:

the period of validity of a meteorological phenomenon;
the temporal following of the flight plan by the aircraft.

8. The method as claimed in claim 1, comprising receiving an update of at least one meteorological phenomenon, and wherein steps b) and c) take such an update into account to update the meteorological indicator.

9. The method as claimed in claim 1, comprising receiving an update of the flight plan, and wherein steps b) and c) take such an update into account to update the meteorological indicator.

10. The method as claimed in claim 1, wherein in the absence of meteorological information relating to the presence of meteorological phenomena over a given time span, step c) displays a third symbol on the time line at the level of this time span, this third symbol signaling an absence of meteorological information.

11. The method as claimed in claim 1, wherein step b) is implemented, moreover, for at least one auxiliary flight plan, and step c) presents a meteorological indicator which comprises, in addition to a time line relating to the flight plan, an auxiliary time line relating to the auxiliary flight plan.

12. The method as claimed in claim 1, wherein the flight plan corresponds to one of the following elements:
an overall flight plan of the aircraft from takeoff to landing;
a part of this overall flight plan.

13. A system for displaying meteorological phenomena encountered by an aircraft flying along a flight plan, the system comprising a display device configured to present on at least one screen comprising at least one time line, the time line representing a time scale relating to the duration of the flight of the aircraft along the flight plan and comprising a symbol indicating the current instant,
wherein:
the system comprises moreover:
a data reception unit configured to receive meteorological phenomena determined by a plurality of meteorological information sources, each of the meteorological phenomena being defined by a defining volume and a period of validity; and
a central unit configured to identify, from among the meteorological phenomena received by the data reception unit, the set of meteorological phenomena for which, on each occasion, a reference volume dependent on the corresponding defining volume is envisaged to be traversed by a leg of the flight plan during the corresponding period of validity, the central unit being also configured to define, for each of the meteorological phenomena thus identified, an associated intersection span representing the common time interval between the period of validity of the meteorological phenomenon considered and the duration associated with the leg of the flight plan traversing the reference volume of the meteorological phenomenon considered; and
the display device is configured to present, on the screen, at least one meteorological indicator, the meteorological indicator comprising at least the time line and, on this time line, at least one set of first symbols illustrating the meteorological phenomena identified and each positioned on the time line at the level of the associated intersection span.

14. The system as claimed in claim 13, wherein the display device is configured to present, on the screen, in addition to the meteorological indicator, a navigation display representing the meteorological phenomena.

15. The system as claimed in claim 13, wherein it comprises, moreover, the plurality of meteorological information sources, which are able to transmit data to the data reception unit.

\* \* \* \* \*